US007306744B2

(12) United States Patent
Matsuo et al.

(10) Patent No.: US 7,306,744 B2
(45) Date of Patent: Dec. 11, 2007

(54) METHOD OF MANUFACTURING A NOZZLE PLATE

(75) Inventors: Yoshihide Matsuo, Nagano (JP); Katsuji Arakawa, Nagano (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 11/116,045

(22) Filed: Apr. 27, 2005

(65) Prior Publication Data

US 2005/0269289 A1 Dec. 8, 2005

(30) Foreign Application Priority Data

Jun. 8, 2004 (JP) ............................ 2004-170024

(51) Int. Cl.
*G01D 15/00* (2006.01)

(52) U.S. Cl. .......................... 216/27; 118/247; 216/67; 216/56; 216/63; 216/62; 216/79; 216/94; 216/95; 216/99; 216/41

(58) Field of Classification Search ................ 118/247; 216/27, 67, 56, 63, 62, 79, 94, 95, 99, 41
See application file for complete search history.

(56) References Cited

U.S. PATENT DOCUMENTS 4,455,192 A * 6/1984 Tamai ......................... 216/27
4,612,554 A * 9/1986 Poleshuk ..................... 347/63
5,501,893 A 3/1996 Laermer et al.
6,171,510 B1 * 1/2001 Lee ............................ 216/27
6,302,523 B1 * 10/2001 Smith et al. .................. 347/45
6,303,042 B1 * 10/2001 Hawkins et al. .............. 216/27
6,423,476 B1 * 7/2002 Yun ........................... 430/320
6,902,867 B2 * 6/2005 Hall et al. .................. 430/311
2003/0019576 A1 * 1/2003 Torres-Filho et al. ....... 156/344
2003/0179169 A1 * 9/2003 Izumi .......................... 345/87
2004/0094845 A1 * 5/2004 Shizuno ...................... 257/780
2004/0201650 A1 * 10/2004 Higuchi et al. ............... 347/71

FOREIGN PATENT DOCUMENTS

EP 1 027 992 A2 8/2000
EP 1 065 059 A2 1/2001

(Continued)

OTHER PUBLICATIONS

Communication from European Patent Office regarding counterpart application.

*Primary Examiner*—Philip Tucker
*Assistant Examiner*—Kimberly K McClelland
(74) *Attorney, Agent, or Firm*—Harness, Dickey & Pierce, P.L.C.

(57) ABSTRACT

A method of manufacturing a nozzle plate 2 is disclosed. The nozzle plate 2 has a plurality of nozzle openings 22 through each of which a droplet is adapted to be ejected. The method includes the steps of: preparing a processing substrate (silicon substrate 10) constituted from silicon as a main material, the processing substrate having two major surfaces; providing a supporting substrate 50 for supporting the processing substrate onto one major surface of the processing substrate 50; and forming the plurality of nozzle openings 22 on the other major surface of the processing substrate by subjecting the other major surface of the processing substrate to an etching process while the processing substrate is supported by the supporting substrate 50.

20 Claims, 10 Drawing Sheets

FOREIGN PATENT DOCUMENTS

| | | |
|---|---|---|
| EP | 1 332 879 A1 | 8/2003 |
| JP | 09-057915 | 3/1997 |
| JP | 11-028820 | 2/1999 |
| JP | 2002-093776 | 3/2002 |
| JP | 2002-373871 | 12/2002 |

* cited by examiner

METHOD OF MANUFACTURING A NOZZLE PLATE

CROSS-REFERENCE TO RELATED APPLICATION

This application claims priority to Japanese Patent Application No. 2004-170024 filed Jun. 8, 2004, which is hereby expressly incorporated by reference herein in its entirety.

FIELD OF THE INVENTION

The present invention relates to a method of manufacturing a nozzle plate.

BACKGROUND OF THE INVENTION

An ink jet printer or the like is provided with an ink jet head in which ink droplets are ejected through nozzles.

For example, the ink jet head has a nozzle plate in which a plurality of nozzle openings are formed and a cavity plate for forming cavities each corresponding to each of the plurality of nozzle openings in which ink is filled in cooperation with the nozzle plate so that the nozzle plate and the cavity plate are joined to each other (see Japanese Laid-open Patent Applications Nos. Hei. 11-28820 and Hei. 9-57915, for example). In such an ink jet head, each of the nozzle openings is communicated with the corresponding cavity, and ink droplets are to be ejected through each of the nozzle openings.

The cavity plate is normally constituted from silicon. As an ink jet printer has a high image quality, high density of nozzles is improved. Thus, it is necessary to reduce the difference between coefficients of linear expansion of the nozzle plate and the cavity plate. For this reason, both a nozzle plate and a cavity plate are constituted from silicon in the prior art mentioned above. Further, as high density of nozzles is improved, it is necessary to make a nozzle plate thinner and reduce channel resistance of the nozzle.

In Japanese Laid-open Patent Application No. Hei. 11-28820, when manufacturing such a nozzle plate, a nozzle length is adjusted by forming a nozzle opening from one major surface of a silicon substrate by means of an anisotropy dry etching process using ICP discharge and then digging a portion of the silicon substrate from the other major surface thereof by means of an anisotropy wet etching process.

On the other hand, in Japanese Laid-open Patent Application No. Hei. 9-57915, nozzle openings are formed by polishing a silicon substrate to a predetermined thickness in advance and then subjecting both major surfaces of the silicon substrate to a dry etching process.

However, when high density of nozzles is further improved, it is necessary to make the thickness of the silicon substrate thinner further. The prior arts described above do not disclose how the silicon substrate is processed in this case. If processing of the silicon substrate is carried out while the silicon substrate is put on a stage or the like in a processing apparatus as it is, the silicon substrate is easily broken or cracked during the manufacturing process. Thus, a yield of manufacturing nozzle plates is lowered. As a result, there is fear that this brings about high costs of the nozzle plate.

SUMMARY OF THE INVENTION

It is therefore an object of the present invention to provide a method of manufacturing a nozzle plate that makes the nozzle plate thinner while preventing the nozzle plate from breaking or cracking while manufacturing it.

In order to achieve the above object, the present invention is directed to a method of manufacturing a nozzle plate. The nozzle plate has a plurality of nozzle openings through each of which a droplet is adapted to be ejected. The method includes the steps of:

preparing a processing substrate constituted from silicon as a main material, the processing substrate having two major surfaces;

providing a supporting substrate for supporting the processing substrate onto one surface of the processing substrate; and forming the plurality of nozzle openings on the other surface of the processing substrate by subjecting the other surface of the processing substrate to an etching process-while the processing substrate is supported by the supporting substrate.

Therefore, since the processing substrate is reinforced and protected by the supporting substrate in the nozzle opening forming step, it is possible to make a nozzle plate thinner while preventing crack of the nozzle plate.

In the method of manufacturing a nozzle plate according to the present invention, it is preferable that in the supporting substrate providing step, the processing substrate is bonded to the supporting substrate via a bonding layer including a resin layer constituted from a resin as a main material.

Therefore, since the roughness of surfaces of the processing substrate and the supporting substrate is absorbed by the resin layer (bonding layer), it is possible for the supporting substrate to support the processing substrate more stably.

In the method of manufacturing a nozzle plate according to the present invention, it is preferable that in the nozzle opening forming step the resin layer functions as a stop layer for the etching process.

This makes it possible to form the nozzle openings each passing through the processing substrate completely.

In the method of manufacturing a nozzle plate according to the present invention, it is preferable that the method further includes the step of releasing the processing substrate from the supporting substrate after the nozzle opening forming step.

This makes it possible to release thinned nozzle plate from the supporting substrate.

In the method of manufacturing a nozzle plate according to the present invention, it is preferable that the bonding layer includes a releasing layer provided integrally with or separately from the resin layer which is degenerated when light having predetermined light intensity is irradiated to the releasing layer, and in the releasing layer, bonding force between the processing substrate and the supporting substrate is lowered by irradiating the light having the predetermined light intensity to the releasing layer, whereby the processing substrate is released from the supporting substrate.

This makes it possible to release thinned nozzle plate from the supporting substrate while preventing the crack of the nozzle plate.

In the method of manufacturing a nozzle plate according to the present invention, it is preferable that the supporting substrate has optical transparency for the light.

Therefore, the light having predetermined light intensity can reach the releasing layer surely when the light is irradiated from the back surface of the supporting substrate to release the processing substrate from the supporting substrate.

In the method of manufacturing a nozzle plate according to the present invention, it is preferable that in the releasing step, the processing substrate is released from the supporting substrate using a sucking apparatus for sucking and fixing the processing substrate by means of negative pressure or adhesive power.

Thus, it is possible to prevent crack of the thinned nozzle plate, and this makes it possible to stabilize the transport of the processing substrate (nozzle plate), to enlarge the size of the processing substrate, and to reduce the generation rate of particles.

In the method of manufacturing a nozzle plate according to the present invention, it is preferable that the nozzle opening forming step includes, prior to the etching process, the step of forming a mask on the other surface of the processing substrate while the processing substrate is supported by the supporting substrate.

This makes it possible to prevent crack of the processing substrate more surely while forming the mask.

In the method of manufacturing a nozzle plate according to the present invention, it is preferable that the nozzle opening forming step further includes the steps of:

after the mask forming step, forming first nozzle portions in the processing substrate via the mask, each of the first nozzle portions having substantially the same cross sectional area; and forming second nozzle portions in the processing substrate via the same mask, each of the second nozzle portions having a cross sectional area that gradually increases toward the one surface of the processing substrate.

This makes it possible to prevent misalignment of the center axis lines of the first nozzle portion and the corresponding second nozzle portion.

In the method of manufacturing a nozzle plate according to the present invention, it is preferable that the first nozzle portions are formed by means of an anisotropy etching process and the second nozzle portions are formed by means of an isotropy etching process.

This makes it possible to prevent misalignment of the center axis lines of the first nozzle portion and the corresponding second nozzle portion more surely.

In the method of manufacturing a nozzle plate according to the present invention, it is preferable that the nozzle opening forming step includes the step of forming the plurality of nozzle openings each having substantially the same cross sectional area on the other surface of the processing substrate via the mask by means of the etching process.

This makes it possible to form the nozzle openings relatively easily. Further, since vibration of ink level can be suppressed in an extremely short time after ejecting an ink droplet in an ink jet head provided with such a nozzle plate, more stable printing quality can be obtained with higher speed.

In the method of manufacturing a nozzle plate according to the present invention, it is preferable that the etching process includes a dry etching process.

This makes it possible to form the nozzle openings each having substantially the same cross sectional area with higher accuracy.

In the method of manufacturing a nozzle plate according to the present invention, it is preferable that the nozzle opening forming step includes the step of forming a groove and/or hole for dividing the processing substrate into chips at the same time of forming the nozzle openings.

Therefore, it is no need to carry out a dicing process for chips as another step after the etching process, thereby simplifying the manufacturing process of the nozzle plate. Further, by forming the nozzle openings and the grooves and/or holes for dividing the nozzle plates into chips using a single mask, it is possible to reduce variation of the positions of the nozzle openings in the nozzle plate with respect to each nozzle plate during mass production of the nozzle plate.

In the method of manufacturing a nozzle plate according to the present invention, it is preferable that the nozzle opening forming step includes the step of forming a hole for alignment of the nozzle plate at the same time of forming the nozzle openings.

Therefore, it is no need to form the hole for alignment at another step, thereby simplifying the manufacturing process of the nozzle plate. Further, it is possible to prevent crack of the nozzle plate from occurring while forming the hole for alignment.

In the method of manufacturing a nozzle plate according to the present invention, it is preferable that the method further includes the step of forming a concave portion on the other surface of the processing substrate before the nozzle opening forming step, wherein a region where the concave portion is formed includes regions where the nozzle openings are to be formed.

Therefore, it is possible to make a nozzle length of each of the nozzle openings shorter without lowering processing accuracy of the nozzle openings. Further, the nozzle plate thus obtained can prevent crack of the nozzle opening due to contact between the nozzle plate and an object that droplets are to be ejected from occurring.

BRIEF DESCRIPTION OF THE DRAWINGS

The foregoing and other objects, features and advantages of the present invention will become more readily apparent from the following detailed description of preferred embodiments of the present invention which proceeds with reference to the accompanying drawings.

DETAILED DESCRIPTION OF THE INVENTION

Preferred embodiments of a method of manufacturing a nozzle plate to which the present invention is applied will now be described in detail with reference to the appending drawings.

First Embodiment

First, prior to the explanation of the method of manufacturing the nozzle plate of the present invention, the structure of an ink jet head 1 provided with the nozzle plate that has been manufactured by means of the method of the manufacturing the nozzle plate according to the present invention. In this case, although an ink jet head in which an electrostatic drive system is adopted will be described as an example in the present embodiment, the ink jet head is not limited thereto. For example, other drive system such as piezoelectric drive system may be adopted in the ink jet head.

(Ink Jet Head)

Figure 1:
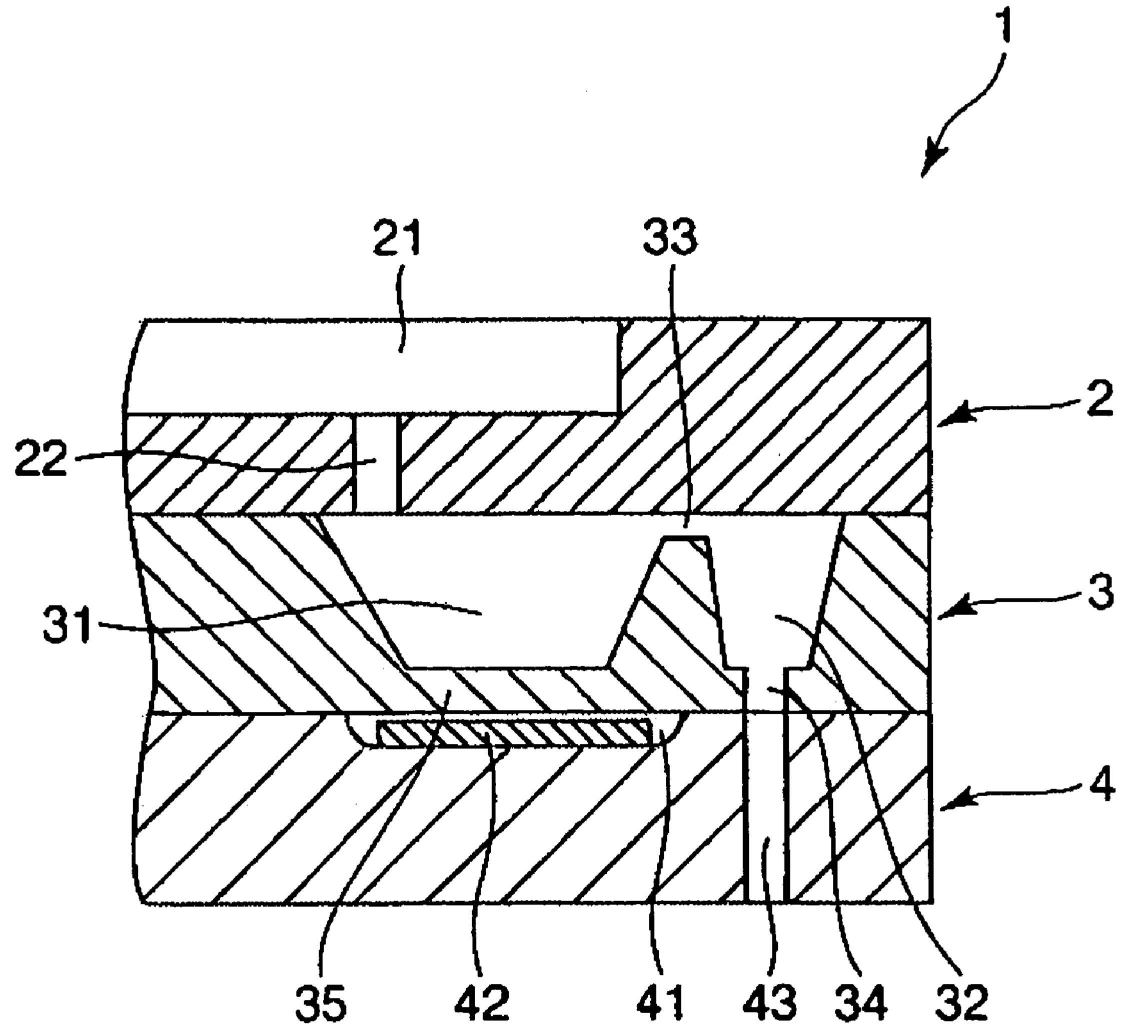
FIG. 1 is a cross sectional view which schematically shows an ink jet head provided with the nozzle plate that has been manufactured by means of the present invention.
Figure 2:
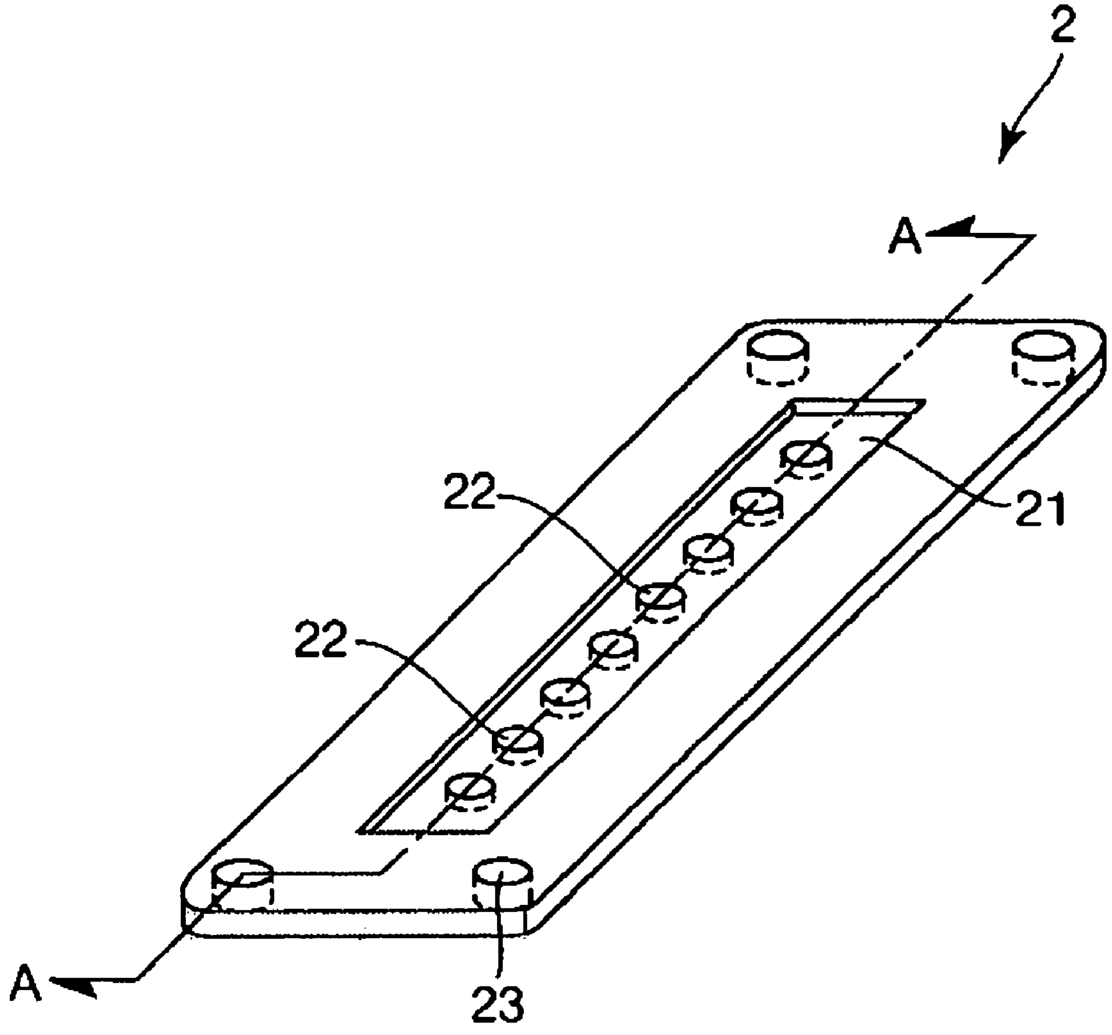
FIG. 2 is a perspective view which shows a nozzle plate of a first embodiment according to the present invention.

FIG. 1 is a cross sectional view which schematically shows the ink jet head 1. FIG. 2 is a perspective view which schematically shows the structure of the nozzle plate 2 with which the ink jet head 1 is provided. Now, in following explanations using FIGS. 1 and 2, for convenience of explanation, an upper side, a lower side, a right side and a left side in FIG. 1 or 2 are referred to as "upper", "lower", "right" and "left", respectively.

The ink jet head 1 is an electrostatic drive type ink jet head. As shown in FIG. 1, the ink jet head 1 is constructed by bonding a nozzle plate 2 constituted from silicon as a main material, a cavity plate 3 constituted from silicon as a main material and a substrate for electrodes (electrode substrate) 4 constituted from glass as a main material in this order.

As shown in FIGS. 1 and 2, in the nozzle plate 2, a thin wall portion is formed by forming a concave portion 21 on the upper side thereof, and a plurality of nozzle openings 22 are formed in the thin wall portion. Namely, the tip of each of the nozzle openings 22 (upper side end thereof) opens on the bottom surface of the concave portion 21. This makes it possible to prevent a chip of the nozzle due to rubbing of the head on an object to be printed from occurring during a printing time. The cavity plate 3 is bonded to one major surface of the nozzle plate 2 (lower side major surface thereof in FIGS. 1 and 2).

Concave portions are formed in the cavity plate 3 so that a plurality of independent cavities (chamber for receiving ink) 31 each communicated with the corresponding each of the nozzle openings 2 described above, a single reservoir (common ink chamber) 32 and a plurality of ink supply ports (orifices) 33 that allow communication between the reservoir 32 and each of the cavities 31 are formed in cooperation with the nozzle plate 2 described above. Each of the cavities 31 receives supply of ink from the reservoir 32 via the ink supply port 33. An ink intake port 34 for supplying the ink from an ink cartridge (not shown in the drawings) to the reservoir 32 is formed in the reservoir 32.

Further, as shown in FIG. 1, a bottom wall formed as a thin wall in each of the cavities 31 constitutes a diaphragm 35 that can undergo elastic deformation (elastic displacement) in the thickness direction thereof, that is, in the up-and-down direction in FIG. 1. Thus, each of the cavities 31 can change in the volume thereof by vibration (displacement) of the diaphragm 35, and is constructed so as to eject the ink (liquid) in the form of droplets from the corresponding nozzle opening 22 by means of the volume change. The electrode substrate 4 is bonded to one major surface of the cavity plate 3 (the lower side surface in FIGS. 1 and 2).

In the electrode substrate 4, a plurality of concave portions 41 are formed at the portions where they face to the respective diaphragms 35 described above, and an individual electrode 42 is formed at the bottom surface of each of the concave portions 41. Further, an ink supply channel 43 communicated with the ink intake port 34 described above is formed in the electrode substrate 4. The ink supply channel 43 is connected to the ink cartridge (not shown in the drawings), whereby ink from the ink cartridge can be supplied to the reservoir 32 via the ink intake port 34.

The diaphragms 35 in the cavity plate 3 functions as a common electrode. When a voltage is applied between the cavity plate 3 and each of the individual electrodes 42, the diaphragm 35 facing to the individual electrode 42 undergoes vibration due to electrostatic force and this makes the volume change of the corresponding cavity 31 occur, whereby the ejection of an ink droplet from the corresponding opening 22 is carried out. Since the ink jet head 1 provided with the thin nozzle plate 2 in which the nozzle openings 22 are formed in high density as described above has a stable ink ejection characteristic, it is possible to carry out a high resolution printing operation with a high speed.

(Method of Manufacturing Nozzle Plate)

A method of manufacturing a nozzle plate according to the present invention includes the steps of: preparing a processing substrate constituted from silicon as a main material, the processing substrate having two major surfaces; providing a supporting substrate for supporting the processing substrate onto one surface of the processing substrate; and forming the plurality of nozzle openings on the other surface of the processing substrate by subjecting the other surface of the processing substrate to an etching process while the processing substrate is supported by the supporting substrate. Namely, the nozzle plate 2 described above is obtained through these steps of the method.

Figure 3:
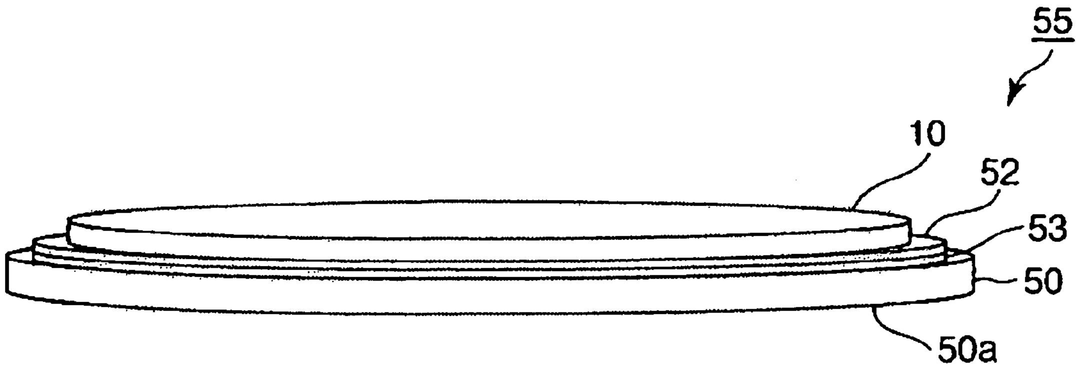
FIG. 3 is a perspective view which schematically shows a supporting substrate and a transporting member used in the first embodiment.
Figure 4:
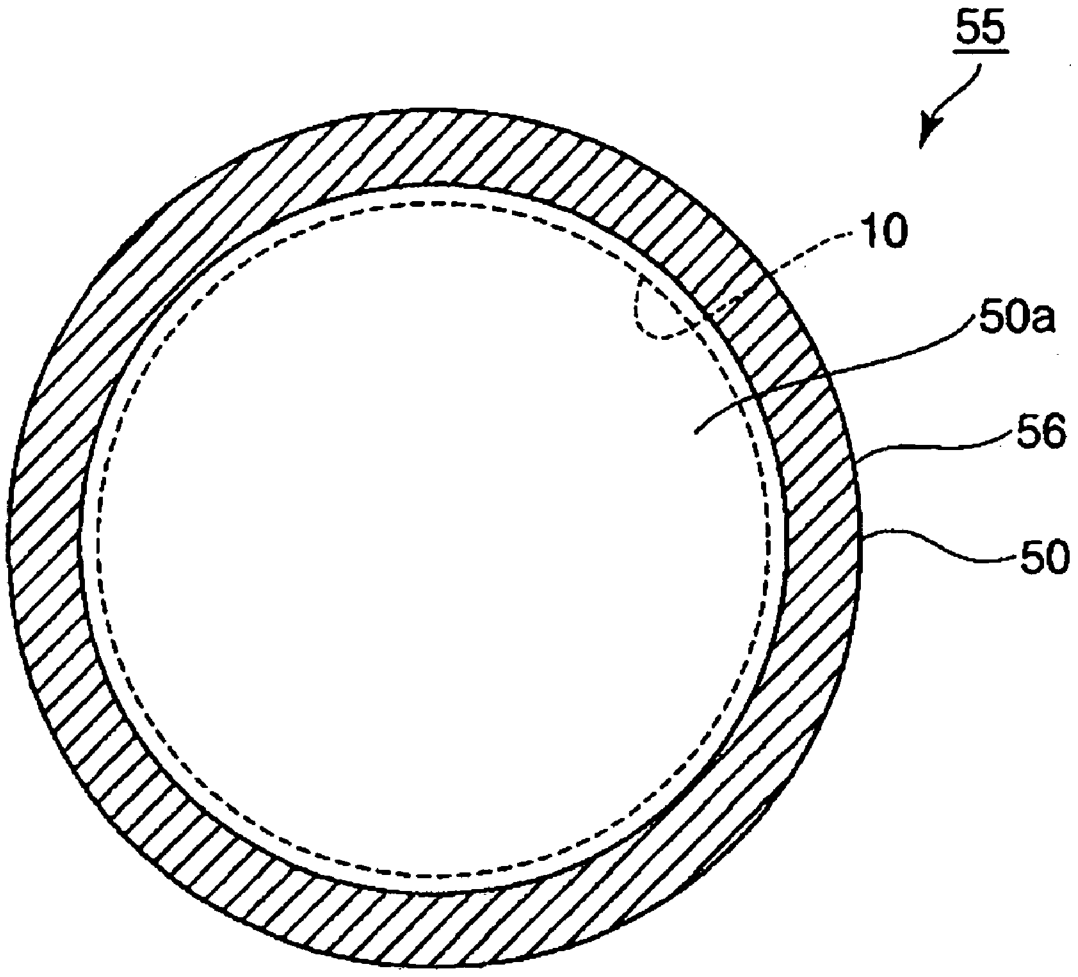
FIG. 4 is a plan view of the transporting member shown in FIG. 3 when viewed from the back surface side thereof.
Figure 5:
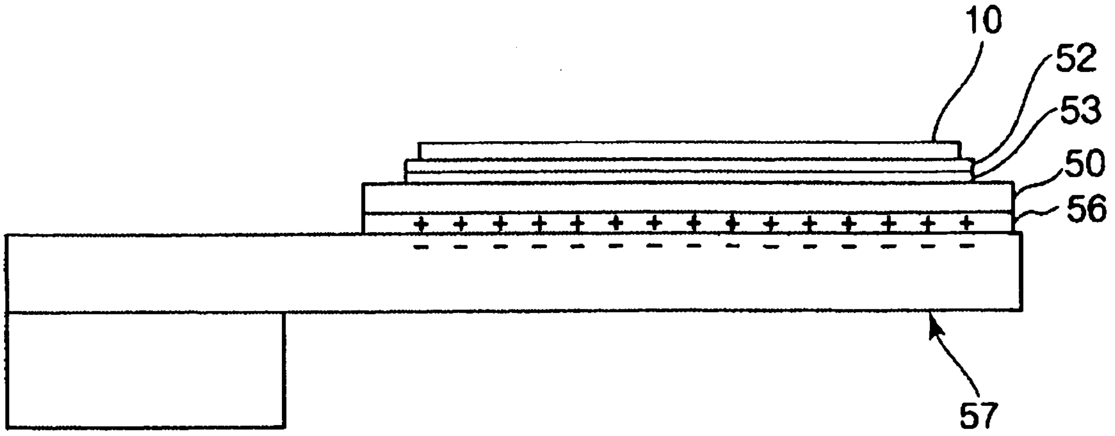
FIG. 5 is a drawing which shows a substrate holding apparatus using an electronic adsorption technology.
Figure 6:
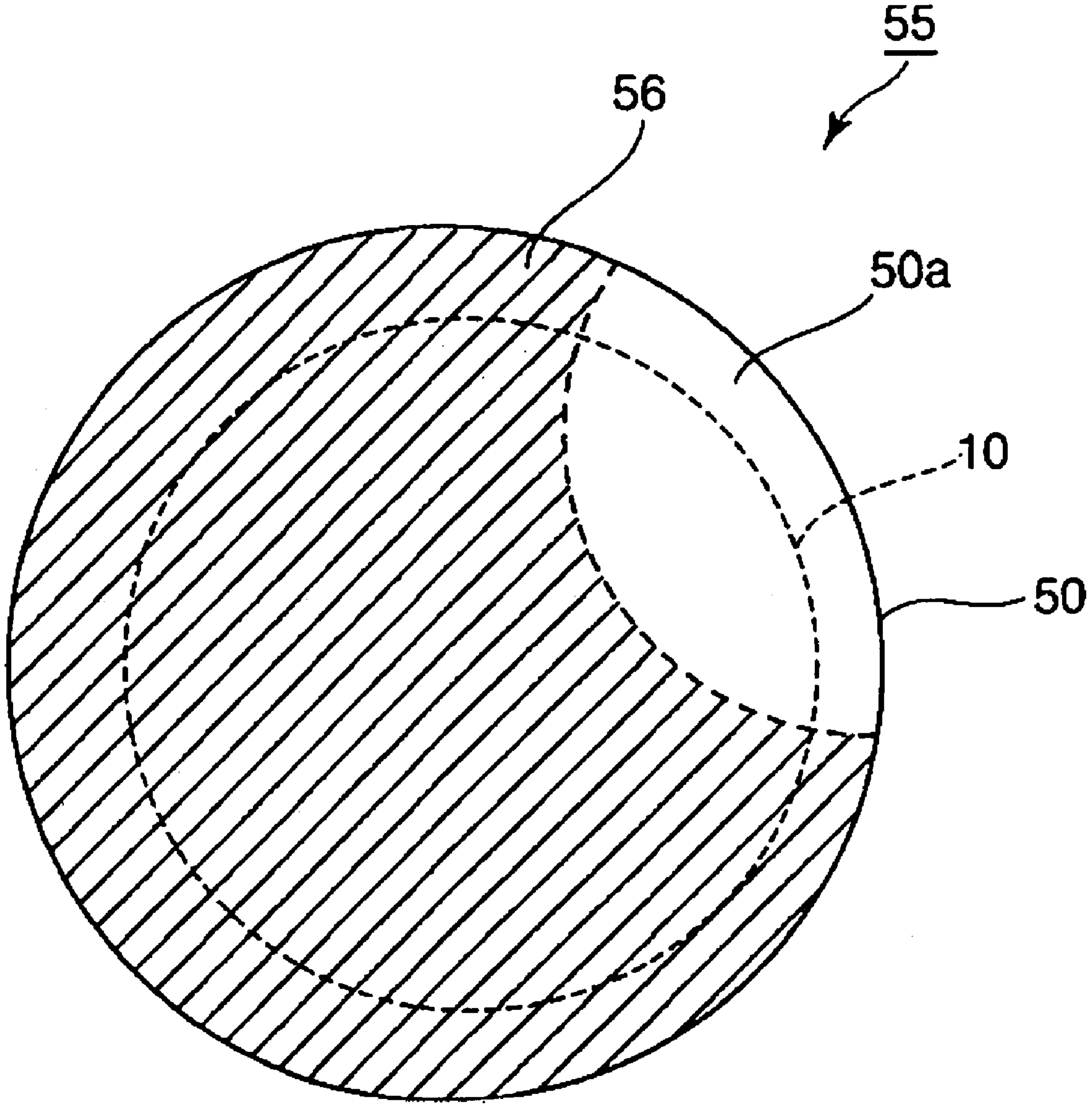
FIG. 6 is a drawing which shows a supporting substrate and a transporting member having another structure and is a plan view of the transporting member shown in FIG. 3.

Now, an embodiment of a transporting member in which a processing substrate is supported by a supporting substrate will be described with reference to FIGS. 3 to 6. FIG. 3 is a perspective view which schematically shows the transporting member. FIG. 4 is a plan view of the transporting member shown in FIG. 3 when viewed from the back surface side thereof. FIG. 5 is a drawing which shows a substrate holding apparatus using an electronic adsorption technology. FIG. 6 is a drawing which shows a transporting member having another structure and is a plan view of the transporting member shown in FIG. 3 when viewed from the back surface side thereof. In this regard, in each drawing used in the following explanation, a scale of each part is changed appropriately because each part is made to be a recognizable size.

A supporting substrate 50 is used in the form of a transporting member 55 by bonding it to a silicon substrate 10 as the processing substrate. The supporting substrate 50 reinforces or protects the silicon substrate 10 at setup onto a transport apparatus or processing apparatus or at steps of manufacturing the nozzle plate 2 such as polishing step and dry etching process step (described later).

The transporting member 55 is constructed by integrally bonding the supporting substrate 50 and the silicon substrate 10 via a resin layer 52 and a releasing layer 53. In other words, in the transporting member 55, the silicon substrate 10 is supported by the supporting substrate 50 by attaching the silicon substrate 10 to the supporting substrate 50. In this case, the resin layer 52 functions to bond the silicon substrate 10 to the supporting substrate 50 by absorbing roughness of the surface of the silicon substrate 10. The releasing layer 53 functions to release the silicon substrate 10 from the supporting substrate 50 after a predetermined process (described later). These layers function as a bonding layer for bonding the silicon substrate 10 to the supporting substrate 50.

Since the roughness of surfaces of the silicon substrate 10 and the supporting substrate 50 is absorbed by the resin layer (bonding layer) 52 in this manner, the supporting substrate 50 can support the silicon substrate 10 more stably. As a result, it is possible to prevent crack of the nozzle plate 2 (that is, silicon substrate 10) from occurring at the manufacturing process thereof (described later), and therefore it is possible to make the nozzle plate 2 (silicon substrate 10) thinner.

It is preferable that the supporting substrate 50 has optical transparency for light. Thus, the light having predetermined light intensity (releasing energy) can reach the releasing layer 53 surely when the light is irradiated to the back surface 50*a* of the supporting substrate 50 to release the silicon substrate 10 from the supporting substrate 50. A constituent material of the supporting substrate 50 is not particularly limited as long as light for degenerating the releasing layer 53 is permeated through the supporting substrate 50. For example, glass can be used for the supporting substrate 50.

It is preferable that the plan structure of the supporting substrate 50 is determined in accordance with the plan structure of the silicon substrate 10. In the present embodiment, each plan structure of both the silicon substrate 10 and the supporting substrate 50 is a substantially circular shape in a similar manner. The external diameter of the supporting substrate 50 is larger than that of the silicon substrate 10. This is because an end portion of the silicon substrate 10 does not stick out from the supporting substrate 50 even though the center positions of both substrates 10, 50 are slightly out of alignment to each other while bonding the silicon substrate 10 to the supporting substrate 50. In the present embodiment, by preventing the end portion of the silicon substrate 10 from sticking out from the supporting substrate 50 in this manner, it is possible to prevent trouble such as breakage of the edge of the silicon substrate 10 due to contact with other object from occurring while transporting the transporting member 55 or carrying out a predetermined process to the silicon substrate 10.

Further, as shown in FIG. 5, a film 56 that can detect light by means of a detecting sensor used in the transporting apparatus and processing apparatus during processing of the silicon substrate 10 is formed on the back surface 50*a* of the supporting substrate 50. In the present embodiment, the film 56 is formed at the peripheral portion of the back surface 50*a* of the supporting substrate 50 (see FIG. 4). More specifically, the film 56 is formed at annular region that is spread from the edge of the silicon substrate 10 to the edge of the supporting substrate 50 on the back surface 50*a* of the supporting substrate 50. This makes it possible to detect the position of the edge of the supporting substrate 50 and the light having the releasing energy described above can reach the whole area of the releasing layer 53 surely. Moreover, since the position of the edge of the supporting substrate 50 can be detected, it is possible to detect the position of the supporting substrate 50 (and the transporting member 55) satisfactorily.

It is preferable that the film 56 for detecting the light has optical characteristics such as reflectance and light transmission widely different from those of the back surface 50*a* of the supporting substrate 50. For example, a conductive film such as an Al film having low light transmission and high reflectance may be mentioned. Such a conductive film can be formed on the back surface 50*a* of the supporting substrate 50 using a vacuum deposition method, a spattering method, a physical vapor deposition (PVD) method such as ion plating, a chemical vapor deposition method, an ion metal plasma method, an electroless deposition method or the like. In this regard, a semiconductor film constituted from poly-silicon or the like may be used as the film 56 for detecting the light. Further, the film 56 may be a film in which light can permeate as long as the light can be detected on the basis of the difference between the optical characteristics of the supporting substrate 50 and the film 56. The film 56 for detecting the light may be formed before or after bonding the silicon substrate 10 to the supporting substrate 50.

In addition, the supporting substrate 50 of the preset embodiment can electrostatically adsorb other object by forming the film 56 for detecting the light described above. FIG. 5 shows a substrate holding apparatus (electrostatic chuck) 57 using an electronic adsorption technology. As shown in FIG. 5, it is possible to electrostatically adsorb the supporting substrate 50 (and the transporting member 55) using the electrostatic force by electrifying the film 56 formed on the back surface 50*a* of the supporting substrate 50 even though the supporting substrate 50 is constituted from an insulator. Such an electrostatic adsorption technology can be preferably applied to the conductive film such as an Al film or the semiconductor film constituted from poly-silicon or the like described above. By adopting such an electrostatic adsorption technology, it is possible to stabilize the transportation of the transporting member 55, to enlarge the size of the processing substrate and to reduce the generation rate of particles.

The structure of the film 56 for detecting the light is not limited one shown in FIG. 4. For example, as shown in FIG. 6, the film 56 for detecting the light may be formed on the whole area of the back surface 50*a* of the supporting substrate 50. Since it is possible to detect the position of the edge of the supporting substrate 50 even in this case, it is possible to detect the position of the supporting substrate 50 (and the transporting member 55). Further, this example has an advantage that the supporting substrate 50 (and the transporting member 55) can be electrostatically adsorbed to the film 56 because the region where the film 56 is formed is wide. In this case, since light transmission of the film 56 is low and therefore light for release may be intercepted by the film 56, it is preferable to use a film through which light permeates to some extent such as a semiconductor film constituted from poly-silicon or the like as the film 56 for detecting the light.

The resin layer 52 shown in FIG. 3 is not particularly limited as long as the resin layer 52 has a function to bond the silicon substrate 10 to the supporting substrate 50. Various resins may be used as the resin layer 52. More specifically, a thermosetting adhesive and a resin of an indurative adhesive such as a light indurative adhesive can be used. Further, it is preferable that the resin layer 52 is constituted from a material having high resistance to dry etching as a main material. This makes it possible to inhibit the resin layer 52 from being broken in the step of a dry etching process (described layer), and it is possible to prevent transporting trouble associated with the breakage from occurring.

Moreover, since the resin layer 52 is constituted from the material having high resistance to dry etching as a main material, the resin layer 52 functions as a stop layer for the etching process when the nozzle openings 22 are formed by subjecting the silicon substrate 10 to the etching process. This makes it possible to form the nozzle openings 22 each penetrating the silicon substrate 10 completely. Furthermore, it is preferable that the resin layer 52 is constituted from a material having high thermal conductivity as a main material. This makes it possible to improve thermal conductivity of the entire transporting member 55 in the step of a dry etching process (described later), and therefore, it is possible to stabilize the etching characteristic. Further, the resin layer 52 has a function to ease stress generated by the difference between coefficients of linear expansion due to the difference between materials of the silicon substrate 10 and the supporting substrate 50 during processing.

As a method of providing the resin layer 52, various known technologies including an ink jet method, a powder jet method, a squeegeeing method, an application method such as a spin coat method, a spray coat method and a roll coat method in addition to various printing methods can be used. In this regard, in the case where a part of the resin layer 52 adheres to the silicon substrate 10 after releasing the silicon substrate 10 from the supporting substrate 50, the part thereof can be removed from the silicon substrate 10 by dissolving it by means of a solvent or the like.

The releasing layer 53 has a function to generate release ("release within a layer" or "interface release") at the inside of the releasing layer 53 or the interface between the silicon layer 10 and the releasing layer 53 by receiving light such as a laser beam. Namely, when the releasing layer 53 receives light having predetermined light intensity, bonding force between atoms or molecules in the constituent of the releasing layer 53 disappear or is reduced (lowered) and ablation or the like is generated, and this makes release easy to be generated. Further, when the releasing layer 53 receives light having predetermined light intensity, components in the constituent material of the releasing layer 53 may be released in the form of gases or the releasing layer 53 may become gases by adsorbing the light and be released to separate the silicon substrate 10 from the supporting substrate 50. This makes it possible to release thinned nozzle plate 2 from the supporting substrate 50 while preventing the crack of the nozzle plate 2.

More specifically, the constituent material of the releasing layer 53 is not particularly limited as long as it has the functions described above. For example, amorphous silicon, silicon oxide or silicate compound, nitride ceramics such as silicon nitride, aluminum nitride and titan nitride, organic polymer material (inter-atomic bonding is broken by irradiation of light), a metal such as Al, Li, Ti, Mn, In, Sn, Y, La, Ce, Nd, Pr, Gd and Sm, and an alloy including at least one kind of these metals may be mentioned. Among these materials, it is preferable to use amorphous silicon particularly, and more preferably the amorphous silicon includes hydrogen. Thus, when receiving light, hydrogen atoms are released to generate internal pressure in the releasing layer 53, whereby this makes it possible to accelerate the. release. In this case, it is preferable that hydrogen content in the releasing layer 53 is about 2 atom percent (at %) or more, and more preferably it is in the range of 2 to 20 at %. The hydrogen content can be adjusted by appropriately setting conditions for forming the releasing layer 53 such as gas composition, gas pressure, gas atmosphere, a gas flow rate, gas temperature, substrate temperature, and electrical power for a CVD apparatus in the case of using a CVD method.

The method of forming the releasing layer 53 just has to be a method in which the releasing layer 53 can be formed with uniform thickness, and it is possible to be appropriately selected in accordance with conditions such as composition of the releasing layer 53 and thickness thereof. For example, a CVD method (including an MOCCVD method, a low pressure CVD method, an ECR-CVD method), various vapor film forming methods such as an evaporation method, a molecular beam evaporation method, a sputtering method, an ion doping method, and a PVD method, various plating methods such as an electric plating method, a dipping plating method (dipping), and an electroless plating method, a Langmuir Blodgett's (LB) method, various application methods such as a spin coat method, a spray coat method, and a roll coat method, various printing methods, a transcription method, an ink jet method, and a powder jet method can be applied to the method. In this regard, two or more methods among these methods may be combined.

In the case where the composition of the releasing layer 53 is amorphous silicon, it is preferable to form the releasing layer 53 by means of the CVD method, in particular, the low pressure CVD method or a plasma CVD method. Further, in the case where the releasing layer 53 is formed using ceramics by means of a sol-gel method or constituted from an organic polymer material, it is preferable to form the releasing layer 53 by means of the application method, in particular, the spin coat method.

As described above, according to the transporting member 55 having the structure described above, it is possible to stabilize the silicon substrate 10 during a transporting time and processing time because the film 56 for detecting light and electrostatically adsorbing is formed on the back surface 50*a* of the supporting substrate 50.

In this regard, although the resin layer 52 and the releasing layer 53 are constructed to be separate layers in the transporting member 55 described above, they may be constructed to be a single layer. Namely, a layer having adhesive force (bonding force) and a function to generate release by means of light or heat energy (or function to lower the bonding force) may be used as the layer by which the silicon substrate 10 is bonded to the supporting substrate 50. In this case, the technology disclosed in Japanese Laid-open Patent Application No. 2002-373871, for example, can be applied thereto. Further, soda glass may be used as the constituent material of the supporting substrate 50. Since the soda glass includes many kinds of impurities such as Al and Fe, it can be electrostatically adsorbed as described above without forming a conductive film or a semiconductor film.

(Manufacture of the Nozzle Plate)

Next, one example of the method of forming the nozzle plate according to the present embodiment will now be described with reference to FIGS. 7A to 7I. FIGS. 7A to 7I are drawings for explaining the method of manufacturing the nozzle plate according to the first embodiment. In this regard, FIGS. 7A to 7I is shown with a section corresponding to an A-A line section of FIG. 2.

<Processing Substrate Providing Step>

Figure 7A:
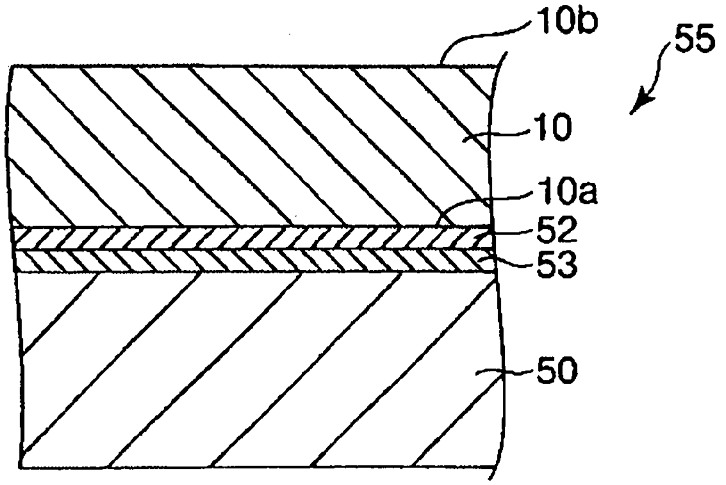
FIGS. 7A to 7I are drawings for explaining a method of manufacturing the nozzle plate according to the first embodiment.

(A) First, as shown in FIG. 7A, one major surface 10*a* of a silicon substrate 10 that is a processing substrate is bonded to a supporting substrate 50 via a resin layer 52 and a releasing layer 53. More specifically, the resin layer 52 and the releasing layer 53 as described above are formed on the supporting substrate 50 in advance, and then the silicon substrate 10 is bonded to the supporting substrate 50.

This makes it possible to bond the silicon substrate 10 to the supporting substrate 50 strongly while the resin layer 52 can absorb roughness on the one major surface 10*a* of the silicon substrate 10. Further, by forming a transporting member 55 so that the silicon substrate 10 is supported by the supporting substrate 50, it is possible to prevent crack or the like from occurring in the silicon substrate 10 due to contact with other object at the time of transporting the silicon substrate 10 or subjecting the other major surface (back surface) 10*b* of the silicon substrate 10. Namely, since the roughness of the silicon substrate 10 and the supporting substrate 50 is adsorbed by the resin layer 52, it is possible to support the silicon substrate 10 with the supporting substrate 50 more stably. As a result, it is possible to prevent crack of the silicon substrate 10 (that is, a nozzle plate 2) from occurring while manufacturing it more surely, and this makes it possible to make the silicon substrate 10 (nozzle plate 2) thinner further.

<Thinner Step>

Figure 7B:
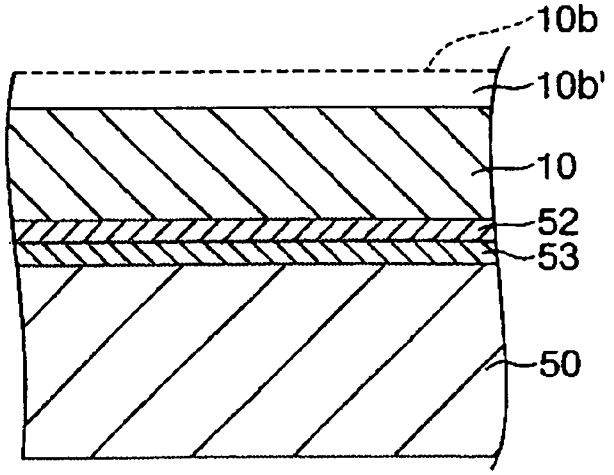

(B) Next, as shown in FIG. 7B, back grind processing is carried out on the other major surface 10*b* of the silicon substrate 10 while the silicon substrate 10 is supported by the supporting substrate 50 as described above, whereby the thickness of the silicon substrate 10 is made thinner to form a surface 10*b*' thereof. This makes it possible to set the thickness of the silicon substrate 10 to the desired thickness of the nozzle plate 2.

At this time, since the silicon substrate 10 is supported by the supporting substrate 50 as described above, it is possible to prevent crack of the silicon substrate 10 from occurring during the back grind processing.

Next, for example, a wet etching process is carried out onto the other major surface 10*b* (the surface 10*b*') of the silicon substrate 10 that has been subjected to the back grind processing. This makes it possible to remove a fracturing layer due to the back grind processing and to reduce surface roughness of the processed surface.

<Concave Portion Forming Step>

(C) Next, a concave portion 21 is formed on the surface 10*b*' of the silicon substrate 10 so that the concave portion 21 encompasses a region where nozzle openings 22 are to be formed. Thus, it is possible to make a nozzle length of each of the nozzle openings 22 shorter without lowering processing accuracy of the nozzle openings 22. Further, the nozzle plate 2 thus obtained can prevent crack of the nozzle opening 22 due to contact between the nozzle plate 2 and an object that droplets are to be ejected from occurring. More specifically, a resist 60 is first applied onto the whole area of the silicon substrate 10. The resist 60 may be any one of photo resist, electron beam resist, X-ray resist and the like, and may be either a positive type or a negative type.

Figure 7C:
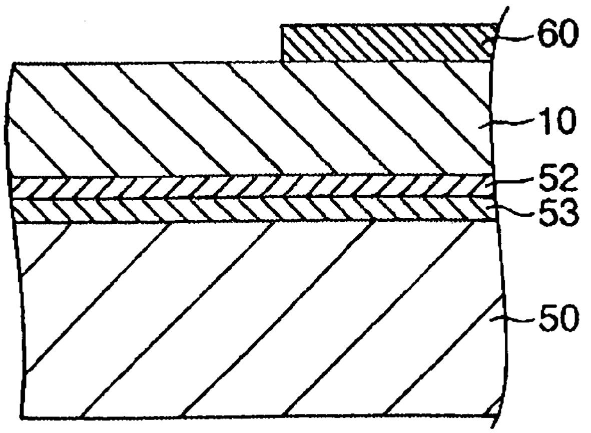
Figure 7D:
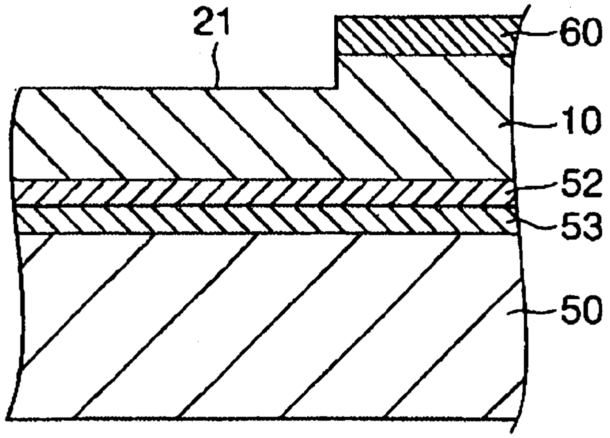

Further, the application of the resist 60 can be carried out by means of a spin coat method, a dipping method, a spray coat method or the like. In this case, a prebaking process may be carried out after applying the resist 60 if necessary. By carrying out an exposure process and a development process onto the resist 60, as shown in FIG. 7C, patterning the shape of openings is carried out on the resist 60 (first patterning). In this case, a postbaking process may be carried out after the patterning of the resist 60 if necessary. By using the resist 60 thus subjected to patterning as a mask, as shown in FIG. 7D, the silicon substrate 10 is subjected to an etching process to form the concave portion 21. The amount of etching is to be set to the thickness of the nozzle plate or less.

In this etching process both a wet etching process and a dry etching process can be used, but it is preferable to use the dry etching process. By using the transporting member 55 as described above, it is possible to carry out the etching process even in a dry etching apparatus that requires electrostatic adsorption. The dry etching process is not particularly limited. For example, a Si high rate etching process (for example, Japanese Laid-open Patent Application No. 2002-93776), a Bosch process method (for example, see U.S. Pat. No. 5,501,893), a reactive ion etching process and an inductively coupled plasma method may be used.

Since the supporting substrate 50 is bonded to the silicon substrate 10, cooling rate tends to be lowered at the dry etching process. As a result, there is fear that etching characteristics such as an etching rate become unstable. However, by constituting the resin layer 52 from a material having high thermal conductivity as a main material, it is possible to improve the thermal conductivity of the entire transporting member 55, and this makes it possible to obtain stable etching characteristics. Further, by constituting the resin layer 52 from a material having high resistance to dry etching as a main material, it is possible to prevent breakage due to the etching process against the resin layer 52, and this makes it possible to prevent transporting trouble from occurring.

Figure 7E:
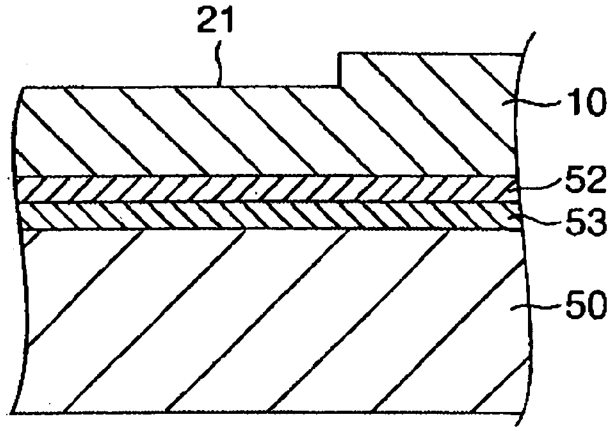

Next, as shown in FIG. 7E, the resist 60 used as an etching mask is removed. Thus, as shown in FIG. 7E, areas to be nozzle portions are formed in the concave portion 21. The removal of the resist 60 can be carried out by means of a dry etching process using $O_2$ plasma, for example. In the concave portion forming step, the concave portion 21 is formed so that the concave portion 21 encompasses a region where the nozzle openings 22 are to be formed prior to a nozzle opening forming step (described later). Therefore, it is possible to make the nozzle length of each of the nozzle openings 22 shorter without lowering processing accuracy of the nozzle openings 22. Further, the nozzle plate 2 thus obtained can prevent crack of the nozzle opening 22 due to contact between the nozzle plate 2 and an object that droplets are to be ejected from occurring.

<Nozzle Opening Forming Step>

Figure 7F:
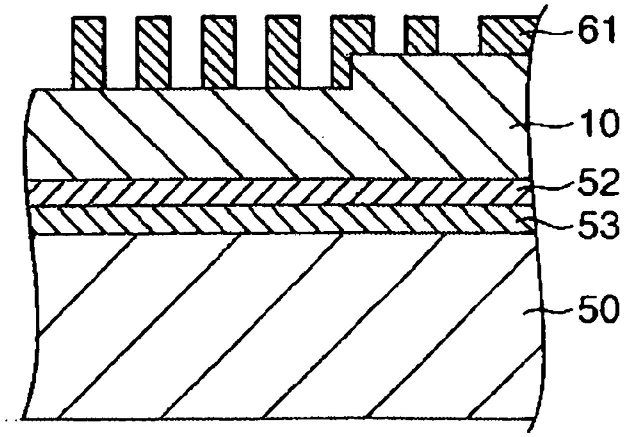

(D) Next, the nozzle openings 22 are formed. More specifically, as shown in FIG. 7F, a resist 61 is first applied onto the whole area of the silicon substrate 10 to be subjected to patterning of the plan shape of each of the nozzle openings 22 (second patterning).

At the same time of the second patterning, scribe lines (grooves and/or holes) 11 for dividing the silicon substrate 10 into chips, and a hole 23 for alignment of setup of an ink jet head are subjected to patterning in addition to hole patterns for the nozzle openings 22. Thus, it is no need to carry out a dicing process for chips as another step after the etching process, thereby simplifying the manufacturing process of the nozzle plate 2. Further, by forming the nozzle openings 22 and the scribe lines 11 using a single mask, it is possible to reduce variation of the positions of the nozzle openings 22 in the nozzle plate 2 with respect to each nozzle plate 2 during mass production of the nozzle plate 2. Moreover, by dividing the nozzle plate 2 into chips by means of the mask etching, it is possible to process the chip corner of each chip to an arbitrary shape such as curved line. In addition, it is no need to form the hole 23 at another step, thereby simplifying the manufacturing process of the nozzle plate 2. It is possible to prevent crack of the nozzle plate 2 from occurring while forming the hole 23.

Figure 7G:
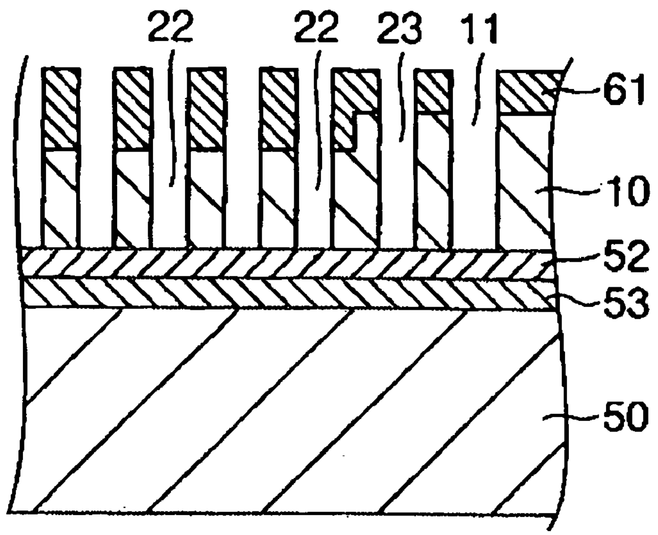

Next, as shown in FIG. 7G, the silicon substrate 10 is subjected to an etching process using the resist 61 thus subjected to patterning as a mask. In this etching process both a wet etching process and a dry etching process can be used, but it is preferable to use the dry etching process. By using the transporting member 55 as described above, it is possible to carry out the etching process even in a dry etching apparatus that requires electrostatic adsorption. The dry etching process is not particularly limited. For example, a Si high rate etching process (for example, Japanese Laid-open Patent Application No. 2002-93776), a Bosch process method (for example, see U.S. Pat. No. 5,501,893), a reactive ion etching process and an inductively coupled plasma method may be used.

It is preferable to carry out an anisotropy dry etching process. Thus, the etching vertically proceeds toward the thickness direction of the silicon substrate 10. As a result, the columnar shaped nozzle openings 22 each having a wall surface perpendicular to the major surface of the silicon substrate 10 are formed. Namely, it is possible to form the nozzle openings 22 each having substantially the same cross sectional area with high accuracy.

By forming the nozzle openings 22 each having substantially the same cross sectional area (in the present embodiment, columnar shape), in the ink jet head 1 vibration of ink level can be suppressed in an extremely short time after ejecting an ink droplet. Therefore, the ink jet head 1 has a feature that more stable printing quality can be obtained with higher speed. Further, it is possible to form the nozzle openings 22 relatively easily. By constituting the resin layer 52 in the transporting member 55 from a material having high resistance to dry etching as a main material, the resin layer 52 functions as a stop layer for the etching process. This makes it possible to form the nozzle openings 22 each passing through the silicon substrate 10 completely.

Figure 7H:
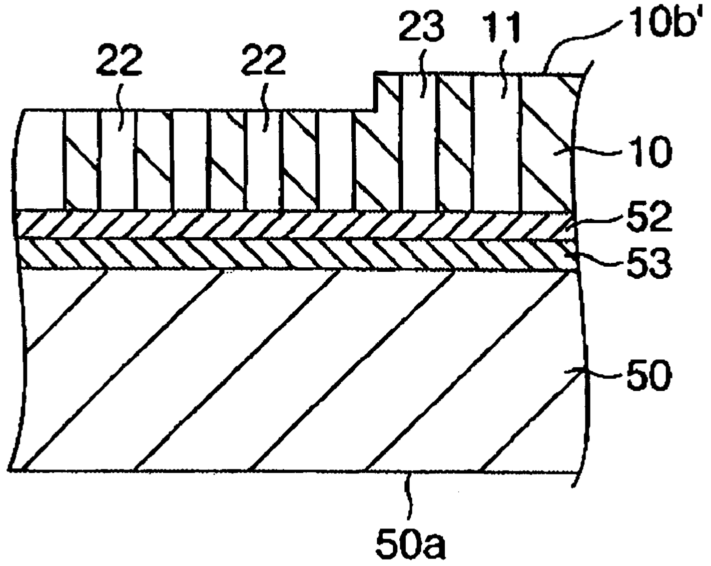

Next, as shown in FIG. 7H, the resist 61 used as an etching mask is removed. Thus, the scribe lines 11 and the alignment hole 23 are formed at the same time when the nozzle openings 22 are formed. The removal of the resist 61 can be carried out by means of a dry etching process using $O_2$ plasma, for example.

Since the silicon substrate 10 is reinforced and protected by the supporting substrate 50 in the nozzle opening forming step, it is possible to make the silicon substrate 10 (nozzle plate 2) thinner while preventing crack of the silicon substrate 10 (nozzle plate 2) during manufacture of the nozzle plate 2. Further, since the resin layer 52 functions as the stop layer for the etching process in the nozzle opening forming step, it is possible to form the nozzle openings 22 each passing through the silicon substrate 10 completely. Moreover, since the nozzle openings 22 are formed in the silicon substrate 10 via the resist 61 after forming the resist 61 on the silicon substrate 10 while the silicon substrate 10 is supported by the supporting substrate 50 in the nozzle opening forming step, it is possible to prevent crack of the silicon substrate 10 while forming the resist 61 more surely.

<Processing Substrate Releasing Step>

Figure 7I:
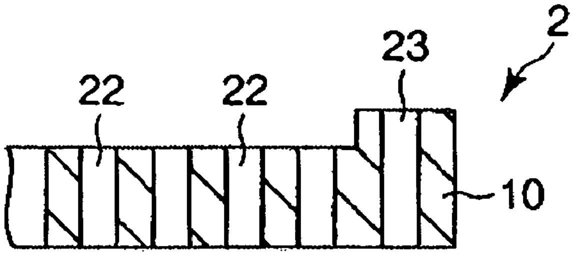

(E) Next, as shown in FIG. 7I, the silicon substrate 10 is released (removed) from the supporting substrate 50. More specifically, light for release is irradiated to the releasing layer 53 through the supporting substrate 50 from a lower side surface 50*a* of the supporting substrate 50. Thus, the releasing layer 53 that has received the light is degenerated, thereby lowering the bonding force between the silicon substrate 10 and the releasing layer 53 (supporting substrate 50).

Next, only the nozzle plates 2 are separated from the silicon substrate 10 and released from the supporting substrate 50. At this time, since the scribe lines 11 for dividing the silicon substrate 10 into chips of the nozzle plates 2 has been already formed at the etching process, it is no need to carry out a dicing process. As described above, the nozzle plate 2 according to the present embodiment as shown in FIGS. 7I and 2 is obtained.

It is preferable to use a sucking apparatus for sucking and fixing the silicon substrate 10 and the divided chips (nozzle plates 2) when the silicon substrate 10 (nozzle plates 2) is released from the supporting substrate 50 and when the silicon substrate 10 is divided into the chips. Thus, it is possible to prevent crack of the thinned silicon substrate 10, and this makes it possible to stabilize the transport of the silicon substrate 10, to enlarge the size of the silicon substrate 10, and to reduce the generation rate of particles.

The sucking apparatus is not particularly limited as long as the sucking apparatus has a function to suck and fix the silicon substrate 10 and the divided chips (nozzle plates 2). For example, one using negative pressure or adhesive power between the silicon substrate 10 and the sucking apparatus may be mentioned.

In this way, in the present invention, by using a transporting structure using the supporting substrate when manufacturing the nozzle plates by processing the silicon substrate, it is possible to process the thinned silicon substrate, and this makes it possible to manufacture nozzle plates that are made to become thinner and high density.

Second Embodiment

Next, a method of manufacturing a nozzle plate of a second embodiment according to the present invention will now be described.

Hereinafter, an explanation will be given for the method of manufacturing the nozzle plate of the second embodiment with reference to FIG. 8; however, differences between the first embodiment described above and the second embodiment are chiefly described, and the description of the similar portions is omitted.

FIG. 8 is a drawing for explaining a method of manufacturing the nozzle plate according to a second embodiment. A nozzle plate 2' of the second embodiment is similar to that of the first embodiment described above except that nozzle openings each constructed from a first nozzle portion having substantially the same cross sectional area at an ink ejection side of the nozzle plate and a second nozzle portion having a cross sectional area that gradually increases toward an ink intake of the nozzle plate at an ink intake side of the nozzle plate.

Namely, the case where the cross sectional shape of the nozzle opening 22 is substantially the same circular shape and the nozzle opening 22 has a cylindrical shape of which the wall surface is perpendicular to the major surface of the silicon substrate 10 has been described as an example in the first embodiment, but a nozzle opening 22' in the second embodiment has a cylindrical shape at the ink ejection side thereof and a conical shape at the ink intake side thereof. In this regard, the cross sectional shape of the nozzle opening 22' may be other shape such as a polygon including a triangle, a quadrilateral, a pentagon, and an elliptic shape other than the circular shape described above.

By constructing the shape of the nozzle opening 22' from the cylindrical shape at the ink ejection side thereof and the conical shape at the ink intake side thereof, in comparison with the case of using cylindrical shape nozzle openings, it is possible to align the direction of ink pressure to be applied to the nozzle opening from the cavity 31 side to a nozzle axis direction, and this makes it possible to obtain stable ink ejection characteristics. Namely, it is possible to reduce variation of the flying direction of ink droplets, to reduce splash of ink droplets, and to prevent variation of the amount of ink droplet.

Figure 8A:
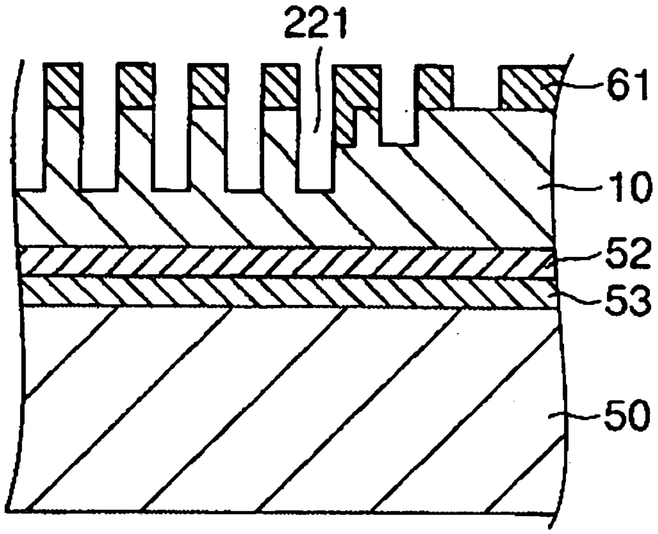
FIG. 8 is a drawing for explaining a method of manufacturing the nozzle plate according to a second embodiment.
Figure 8B:
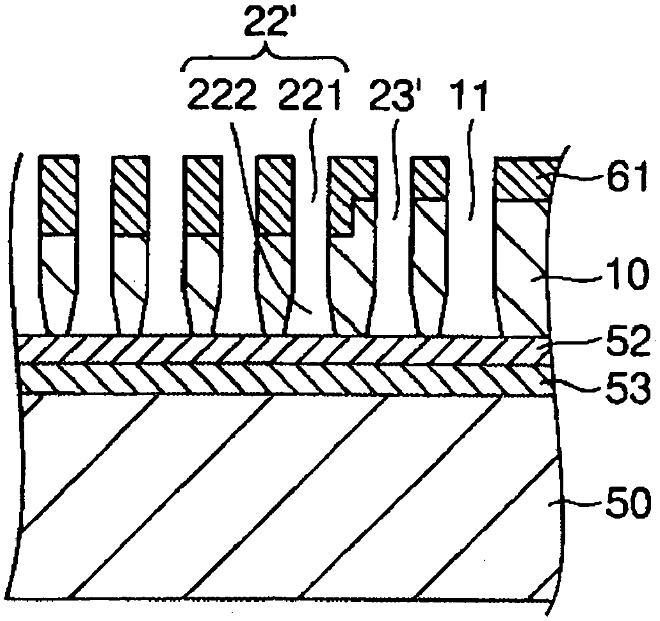

In order to form the two-step nozzle opening 22', as shown in FIG. 8A, the silicon substrate 10 is subjected to an anisotropy etching process using the resist 61 subjected to patterning as a mask in the same manner as the first embodiment, whereby first nozzle portions 221 each having a cylindrical shape are formed (first step). Subsequently, as shown in FIG. 8B, the silicon substrate 10 is subjected to an isotropy etching process with anisotropy to some extent using the same mask from the same surface side as the first step, whereby second nozzle portions 222 each having a conical shape are formed (second step).

It is possible to control the shape of the nozzle opening 22' including a taper shape or anti-taper (thickened toward the end) shape by changing parameters at the etching process such as process pressure and power of etching. In this way, it is possible to obtain the nozzle openings 22' each having an optimum shape by selecting the conditions (parameters) appropriately.

Figure 8C:
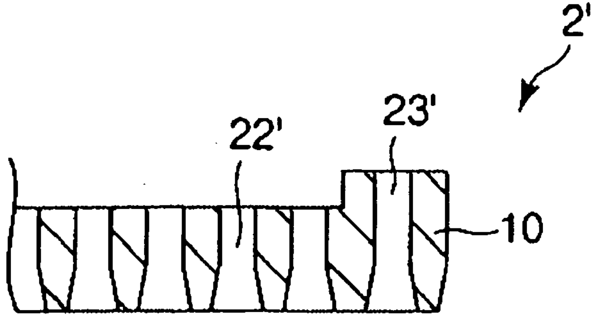

Next, as shown in FIG. 8C, the silicon substrate 10 is released from the supporting substrate 50 and the nozzle plates 2' are separated from the silicon substrate 10, whereby it is possible to obtain the nozzle plates 2'.

Compared with a conventional method in which the first nozzle portions 221 and the second nozzle portions 222 are separately formed by subjecting the silicon substrate 10 to patterning and etching, it is possible to prevent misalignment of the center axis lines of each of the first nozzle portions 221 each having a cylindrical shape and the corresponding second nozzle portion 222 having a conical shape in the method of the present invention in which the silicon substrate 10 is subjected to different etching processes sequentially by changing the etching conditions and using the same patterning. This makes it possible to fly ink droplets directly (or straightforwardly) through the nozzle plate 2', and the ink jet head provided with the nozzle plate 2' can obtain stable ink ejection characteristics without variation of the flying direction of ink droplets.

Further, in the present embodiment, a hole 23' for alignment is formed as well as the nozzle openings 22'. Namely, the cross sectional area of the hole 23' for alignment gradually increases toward the bonding surface between the silicon substrate 10 and the cavity plate 3 at the bonding surface side. Thus, the nozzle plate 2' is guided more smoothly when being bonded to the cavity plate 3, and this makes it possible to improve handling of the nozzle plate 2' when assembling an ink jet head 1.

The method of manufacturing a nozzle plate according to the present invention have been described based on the embodiments shown in the drawings, but it should be noted that the present invention is not limited to these embodiments. Various changes and modifications to the presently preferred embodiments described herein can be made without departing from the spirit and scope of the present invention.

For example, although the case where the scribe lines 11 for dividing the silicon substrate 10 into chips and the hole 23 or 23' for alignment of the nozzle plates 2 or 2' are formed at the same time when forming the nozzle openings 22 or 22' has been described in the first and second embodiments, the scribe lines 11 and the hole 23 or 23' may be formed in any step other than the nozzle opening forming step. In this case, the scribe lines 11 and the hole 23 or 23' may be formed by subjecting to an etching process using a mask other than the resist 61, or they may be formed by cutting the silicon substrate 10 by means of irradiation of a $CO_2$ laser or a YAG laser.

Further, in the case where a part of the resin layer 52 or the releasing layer 53 adheres onto the silicon substrate 10 after the processing substrate releasing step, the part of the resin layer 52 or the releasing layer 53 may be removed from the silicon substrate 10 by dissolving it using a solvent. Moreover, it is possible to lower the bonding force between the silicon substrate 10 and the supporting substrate 50 by dissolving the resin layer 52 and/or releasing layer 53 using a solvent.

What is claimed is:

1. A method of manufacturing a nozzle plate, the nozzle plate having a concave portion on one major surface thereof, the nozzle plate having the other major surface to which a cavity plate is adapted to be bonded so that plurality of independent cavities for receiving liquid are formed in cooperation with the nozzle plate, and a plurality of nozzle openings through each of which the liquid is adapted to be ejected in the form of droplet, the plurality of nozzle openings being formed so as to be substantially parallel along a thickness direction of the nozzle plate and opening at the concave portion, the method comprising the steps of:

preparing a processing substrate formed of silicon as a main material, the processing substrate having two major surfaces;

preparing a supporting substrate for supporting the processing substrate thereon, the supporting substrate having two major surfaces;

bonding one of the two major surfaces of the processing substrate to one of the two major surfaces of the supporting substrate via a bonding layer including a resin layer constituted from a resin as a main material;

forming a concave portion on the other major surface of the processing substrate by subjecting the processing substrate to an etching process so as to form a thin wall portion, the plurality of nozzle openings being to be formed in the thin wall portion, wherein the thus formed concave portion will be used as the concave portion of the nozzle plate;

forming the plurality of nozzle openings in the concave portion of the processing substrate by subjecting the other major surface of the processing substrate to an etching process, wherein the resin layer functions as a stop layer for the etching process; and releasing the processing substrate from the supporting substrate and the bonding layer to obtain the nozzle plate;

wherein the concave portion forming step and the nozzle opening forming step are carried out in a state that the processing substrate is being supported by the supporting substrate;

wherein the nozzle opening forming step includes, prior to the etching process, the step of forming a mask on the other major surface of the processing substrate while the processing substrate is supported by the supporting substrate; and wherein the nozzle opening forming step further includes the steps of:

after the mask forming step, forming first nozzle portions in the processing substrate via the mask from the other major surface of the processing substrate, each of the first nozzle portions having substantially the same cross sectional area, and each of the first nozzle portions being formed to the substantially middle of the processing substrate in a thickness direction thereof; and forming second nozzle portions in the processing substrate via the same mask so that each of the plurality of nozzle openings is constituted from each of the first nozzle portions and the corresponding second nozzle portion, each of the second nozzle portions having a cross sectional area that gradually increases toward the one surface of the processing substrate each nozzle opening being constructed from the first nozzle portion and the corresponding second nozzle portion.

2. The method as claimed in claim 1, wherein the bonding layer further includes a releasing layer provided integrally with or separately from the resin layer which is degenerated when light having predetermined light intensity is irradiated to the releasing layer in the processing substrate releasing step, and in the releasing layer, bonding force between the processing substrate and the supporting substrate is lowered by irradiating the light having the predetermined light intensity to the releasing layer, whereby the processing substrate is released from the supporting substrate.

3. The method as claimed in claim 2, wherein the supporting substrate has optical transparency for the light, and in the processing substrate releasing step the light having the predetermined light intensity is irradiated to the releasing layer through the supporting substrate.

4. The method as claimed in claim 1, wherein in the processing substrate releasing step, the processing substrate is released from the supporting substrate using a sucking apparatus for sucking and fixing the processing substrate by means of negative pressure or adhesive power.

5. The method as claimed in claim 1, wherein the first nozzle portions are formed by means of an anisotropy etching process and the second nozzle portions are formed by means of an isotropy etching process.

6. The method as claimed in claim 1, wherein the etching process includes a dry etching process.

7. The method as claimed in claim 1, wherein the nozzle opening forming step includes the step of forming a groove and/or hole for dividing the processing substrate into chips at the same time of forming the nozzle openings.

8. The method as claimed in claim 1, wherein the nozzle opening forming step includes the step of forming a hole for alignment of the nozzle plate at the same time of forming the nozzle openings.

9. A method of manufacturing a nozzle plate, the nozzle plate having one major surface to which a cavity plate is adapted to be bonded so that a plurality of independent cavities for receiving liquid are formed in cooperation with the nozzle plate, and a plurality of nozzle openings through each of which the liquid is adapted to be ejected in the form of a droplet, each nozzle opening being constructed from a first nozzle portion and a second nozzle portion, the plurality of nozzle openings being formed so as to be substantially parallel along a thickness direction of the nozzle plate, the first nozzle portions being formed so as to open at the other major surface of the nozzle plate, the method comprising the steps of:

preparing a processing substrate formed of silicon as a main material, the processing substrate having two major surfaces;

preparing a supporting substrate for supporting the processing substrate thereon, the supporting substrate having two major surfaces;

bonding one of the two major surfaces of the processing substrate to one of the two major surfaces of the supporting substrate via a bonding layer including a resin layer constituted from a resin as a main material;

forming the plurality of nozzle openings in the processing substrate by subjecting the other major surface of the processing substrate to an etching process while the processing substrate is supported by the supporting substrate, wherein the resin layer functions as a stop layer for the etching process; and releasing the processing substrate from the supporting substrate and the bonding layer to obtain the nozzle plate, the nozzle opening forming step including the steps of:

forming a mask on the other major surface of the processing substrate while the processing substrate is supported by the supporting substrate;

forming the first nozzle portions in the processing substrate via the mask from the other major surface of the processing substrate, each of the first nozzle portions having substantially the same cross sectional area, and each of the first nozzle portions being formed to the substantially middle of the processing substrate in a thickness direction thereof; and forming the second nozzle portions in the processing substrate via the same mask so that each of the plurality of nozzle openings is constituted from each of the first nozzle portions and the corresponding second nozzle portion, each of the second nozzle portions having a cross sectional area that gradually increases toward the one major surface of the processing substrate.

10. The method as claimed in claim 9, wherein the first nozzle portions are formed by means of an anisotropy etching process and the second nozzle portions are formed by means of an isotropy etching process.

11. The method as claimed in claim 9, wherein the bonding layer further includes a releasing layer provided integrally with or separately from the resin layer which is degenerated when light having predetermined light intensity is irradiated to the releasing layer in the processing substrate releasing step, and in the releasing layer, bonding force between the processing substrate and the supporting substrate is lowered by irradiating the light having the predetermined light intensity to the releasing layer, whereby the processing substrate is released from the supporting substrate.

12. The method as claimed in claim 11, wherein the supporting substrate has optical transparency for the light, and in the processing substrate releasing step the light having the predetermined light intensity is irradiated to the releasing layer through the supporting substrate.

13. The method as claimed in claim 9, wherein in the processing substrate releasing step, the processing substrate is released from the supporting substrate using a sucking apparatus for sucking and fixing the processing substrate by means of negative pressure or adhesive power.

14. The method as claimed in claim 9, wherein the nozzle opening forming step includes the step of forming a groove and/or hole for dividing the processing substrate into chips at the same time of forming the nozzle openings.

15. The method as claimed in claim 9, wherein the nozzle opening forming step includes the step of forming a hole for alignment of the nozzle plate at the same time of forming the nozzle openings.

16. The method as claimed in claim 9, further comprising the step of forming a concave portion on the other major surface of the processing substrate by subjecting the processing substrate to an etching process to form a thin wall portion, wherein in the nozzle opening forming step the plurality of nozzle openings are formed in the thin wall portion after formation of the concave portion.

17. The method as claimed in claim 2, wherein the releasing layer is provided separately from the resin layer, and in the bonding step the releasing layer and the resin layer are formed on the supporting substrate in this order to obtain the bonding layer, and then the processing substrate is bonded to the supporting substrate via the bonding layer.

18. The method as claimed in claim 11, wherein the releasing layer is provided separately from the resin layer, and in the bonding step the releasing layer and the resin layer are formed on the supporting substrate in this order to obtain the bonding layer, and then the processing substrate is bonded to the supporting substrate via the bonding layer.

19. The method as claimed in claim 1, further comprising the step of setting the thickness of the processing substrate to the desired thickness of the nozzle plate, the thickness setting step being carried out between the bonding step and the concave portion forming step.

20. The method as claimed in claim 9, further comprising the step of setting the thickness of the processing substrate to the desired thickness of the nozzle plate, the thickness setting step being carried out between the bonding step and the nozzle opening forming step.

* * * * *